(12) United States Patent
Gaudfrin

(10) Patent No.: US 8,585,898 B2
(45) Date of Patent: Nov. 19, 2013

(54) SCRAPPING DEVICE FOR A PRESSURISED FILTRATION PLANT

(75) Inventor: Guy Gaudfrin, Saint Non la Breteche (FR)

(73) Assignee: Gaudfrin, Saint Germain en Laye (FR)

( * ) Notice: Subject to any disclaimer, the term of this patent is extended or adjusted under 35 U.S.C. 154(b) by 125 days.

(21) Appl. No.: 13/126,927

(22) PCT Filed: Oct. 30, 2008

(86) PCT No.: PCT/FR2008/001532
§ 371 (c)(1), (2), (4) Date: Apr. 29, 2011

(87) PCT Pub. No.: WO2010/049599
PCT Pub. Date: May 6, 2010

(65) Prior Publication Data
US 2011/0203988 A1    Aug. 25, 2011

(51) Int. Cl.
*B01D 33/46*    (2006.01)
*B01D 33/58*    (2006.01)
*B01D 33/76*    (2006.01)
*B01D 33/44*    (2006.01)

(52) U.S. Cl.
USPC ........... 210/331; 210/780; 210/791; 210/107; 210/248; 210/324; 210/327; 210/330; 210/332; 210/345; 210/396; 210/398; 210/407; 210/413

(58) Field of Classification Search
None
See application file for complete search history.

(56) References Cited

U.S. PATENT DOCUMENTS

| 3,193,105 | A * | 7/1965 | Putnam | 210/331 |
| 3,591,009 | A * | 7/1971 | Luthi et al. | 210/247 |
| 6,793,809 | B2 * | 9/2004 | Ingelman et al. | 210/143 |
| 2004/0045913 | A1 * | 3/2004 | Flanagan | 210/780 |

FOREIGN PATENT DOCUMENTS

| FR | 1215168 | 4/1960 |
| GB | 939975 | 10/1963 |
| GB | 2 231 504 A | 11/1990 |
| WO | WO 96/38214 A | 12/1996 |
| WO | WO 02/063095 A | 8/2002 |

OTHER PUBLICATIONS

Office action dated Jan. 3, 2013 issued by Kazakhstan Patent Office for corresponding Kazakhstan application No. 2011/1551.1 with English translation.

* cited by examiner

*Primary Examiner* — Benjamin Kurtz
(74) *Attorney, Agent, or Firm* — Frommer, Lawrence & Haug, LLP; Ronald R. Santucci

(57) ABSTRACT

The present invention relates to a pressurized filtration plant that includes: a sealed tank (1) in which discs (2) are provided including filtering sectors (20) carried by a rotary shaft (3) and connected to collectors within said shaft, a dispenser (10) enabling the egress of filtrates, the discharge of spinning air and the intake of blowing air for releasing the spun cakes, at least one duct for supplying a liquid laden with solid particles, at least one duct or discharging the filtrates, and a hopper (1*b*) for recovering the solid particles, characterized in that the discs (2) are vertically arranged so that the lower portion thereof is submerged in buckets (4) covered with deflectors (41) and including means for scrapping solid material deposits on the outer walls thereof.

7 Claims, 2 Drawing Sheets

SCRAPPING DEVICE FOR A PRESSURISED FILTRATION PLANT

This application is a 371 of PCT/FR2008/001532 filed on Oct. 30, 2008, published on May 6, 2010 under publication number WO 2010/049599 A, the entire disclosure of which is incorporated herein by reference.

The present invention relates to a liquid/solid separation device and more particularly to a pressurized disk filtration device.

The prior art and, in particular, FR1215168, discloses a pressurized disk filtration device. This device comprises a housing formed of an airtight vessel in which disks made up of sectors covered with a jacket of filter cloth are housed.

The sectors are connected to collectors enclosed in a rotary shaft provided with a distributor that lets out the filtrate, vents the deliquoring air and admits the blowing air intended for detaching the deliquored cakes.

The disks are arranged vertically so that at least their lower part is immersed in troughs intended to receive the laden liquid.

The pressurized filtration process dictates the use of an airtight and robust housing and of a device for extracting the deliquored cakes or deposits.

However, on the other hand, it does allow the separation efficiency to be improved, allows better deliquoring of the cakes and is able to process volatile or high-temperature suspensions.

One application of the devices of this type is to be found more specifically in the sugar refining industry and the mineral industry.

However, these industries call for very high capacity filtration plants which means that large filtering surface areas need to be housed in small-volume housings in order to limit the space occupied. Now, the filtering surface area is proportional to the number of disks used and optimizing the device therefore means that the disks can be brought as close together as possible.

For a given vessel, the greater the number of disks, the less space is available between the troughs of the disks for removing the deliquored cakes, which means that the risks of clogging are high notably because of the formation of bridges of solid matter between the flanks of the troughs.

What is more, clogging may lead to a build-up of cake in the region situated above the troughs and therefore between the disks themselves, thus creating a massive overload which could cause them to deform or even to break.

It is an object of the present invention to address these technical problems effectively and satisfactorily.

This object is achieved, according to the present invention, by means of a device in which the disks are arranged vertically so that their lower part is immersed in troughs covered by deflectors and comprising means of scraping deposits of solid matter off their exterior walls.

According to one advantageous feature, said scraper means comprise pivoting doctor blades mounted on a horizontal support spindle positioned under the troughs and provided with a link rod the end of which is connected to a control actuator.

According to another feature, said doctor blades are borne by a cylindrical mount equipped with a set of two setting pins and intended to be fixed into tubular sleeves that pass through the spindle.

For preference, said pins are engaged in notches formed in the outer end of the tubular sleeves.

According to an advantageous alternative form, said doctor blades are secured in pairs so that they act on the facing walls of two adjacent troughs.

Provision is made for said support spindle to be positioned under the troughs in a region not in the path of the cakes.

According to another alternative form, said actuator is a pneumatic actuator and via a link rod causes the doctor blades to move back and forth along the exterior walls of the troughs.

The device of the invention makes it possible to achieve a high filtration capacity and high-performance filtration within a housing of restricted volume.

The risks of the formation of bridges and of clogging are eliminated through the scraping action of the doctor blades the reciprocating movement of which constantly eliminates any deposits of solid matter along the walls of the troughs as soon as such deposits appear.

Furthermore, the scraper means are easy to maintain because the doctor blades are held on the support spindle under their own weight. Thus, they are very quick to fit and their occasional replacement is likewise very quick.

The invention will be better understood from reading the description, given hereinafter by way purely of explanation, of one embodiment of the invention, with reference to the attached figures in which.

Figure 1:
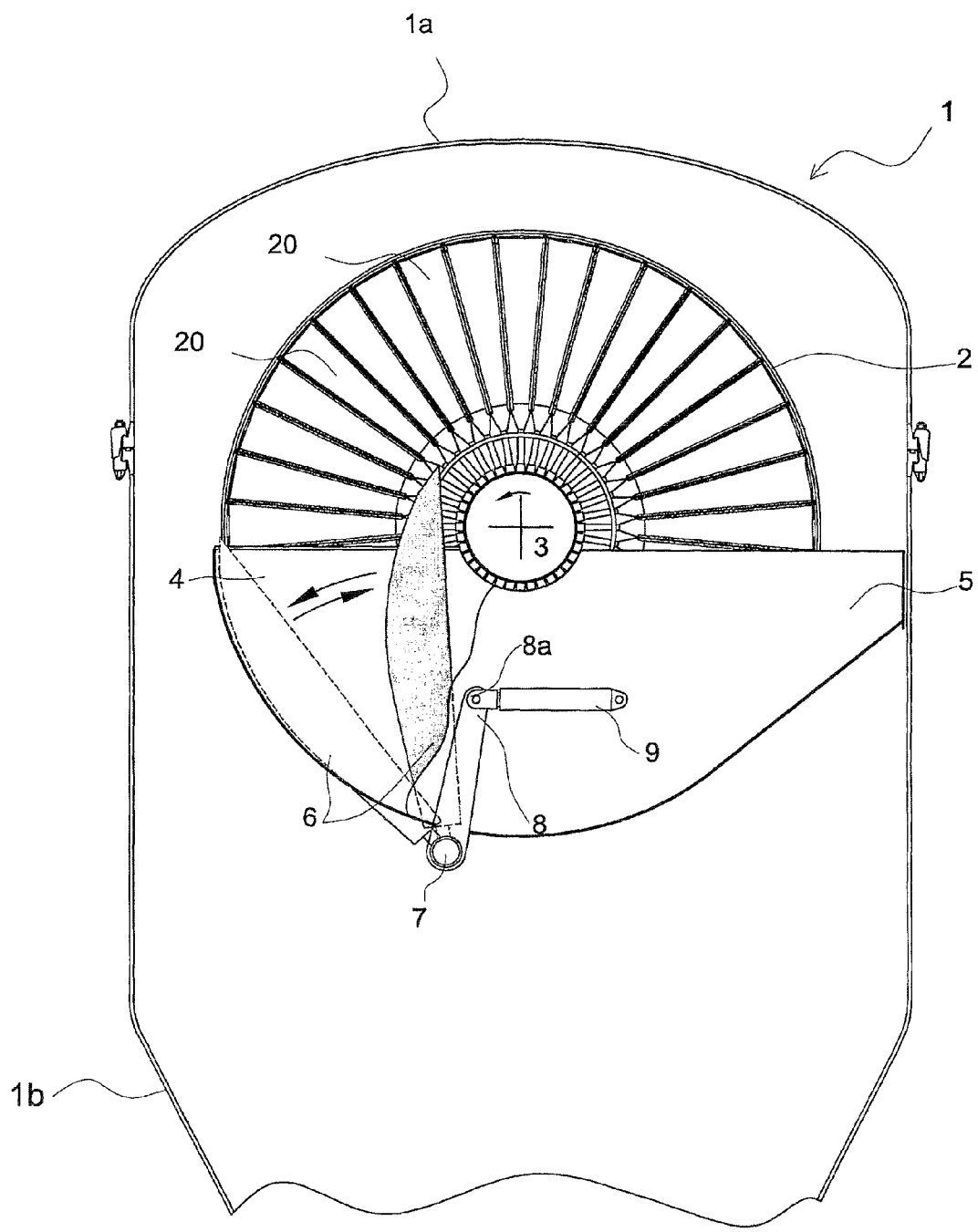
FIG. 1 depicts a side view of one embodiment of the device of the invention.

The filtration device depicted in FIG. 1 comprises an external housing here formed of a vertical vessel 1 the cylindro-conical structure of which is airtight and strengthened so that it is able to withstand internal pressures of the order of 10 barg.

The device comprises at least one inlet pipe for liquid laden with solid particles and at least one filtrate outlet pipe (neither pipe has been depicted).

The lower part of the vessel 1 consists of a conical hopper 1b that receives the deliquored cakes before they are extracted.

The upper part comprises a dome 1a forming the lid of the vessel 1. The dome 1a can be removed to provide access for intervention on the internal elements.

The vessel 1 contains a series of filter disks 2 arranged vertically and mutually parallel.

The disks 2 are mounted on a rotary shaft 3 extending horizontally inside the vessel 1.

The structure of the disks is the traditional one and consists of sectors 20 delimited by a metal framework, each sector being covered with a jacket made of filter cloth and being radially coupled to a pipe formed inside the shaft 3.

The disks 2 are arranged vertically in the vessel 1 so that at least their lower part is immersed in troughs 4 containing a bath of liquid laden with solid matter.

Figure 3:
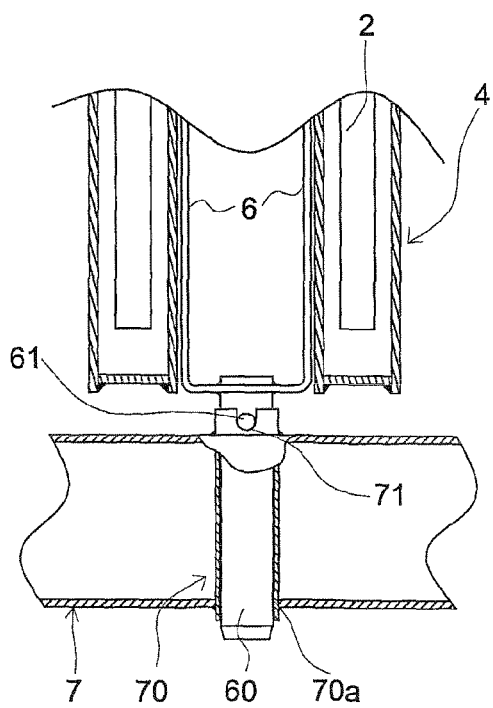
FIG. 3 depicts an enlarged plan view of a detail of the device of FIG. 1.

The troughs 4 have vertical lateral walls 41 which flank each disk and which isolate it from the adjacent disk, as depicted in the partial view of FIG. 3.

The upper edge of the walls of the troughs 4 is surmounted by a deflector 41, that does not make contact with the flank of the disks 2, and which covers and partially closes off the interior compartment of each trough.

Figure 2:
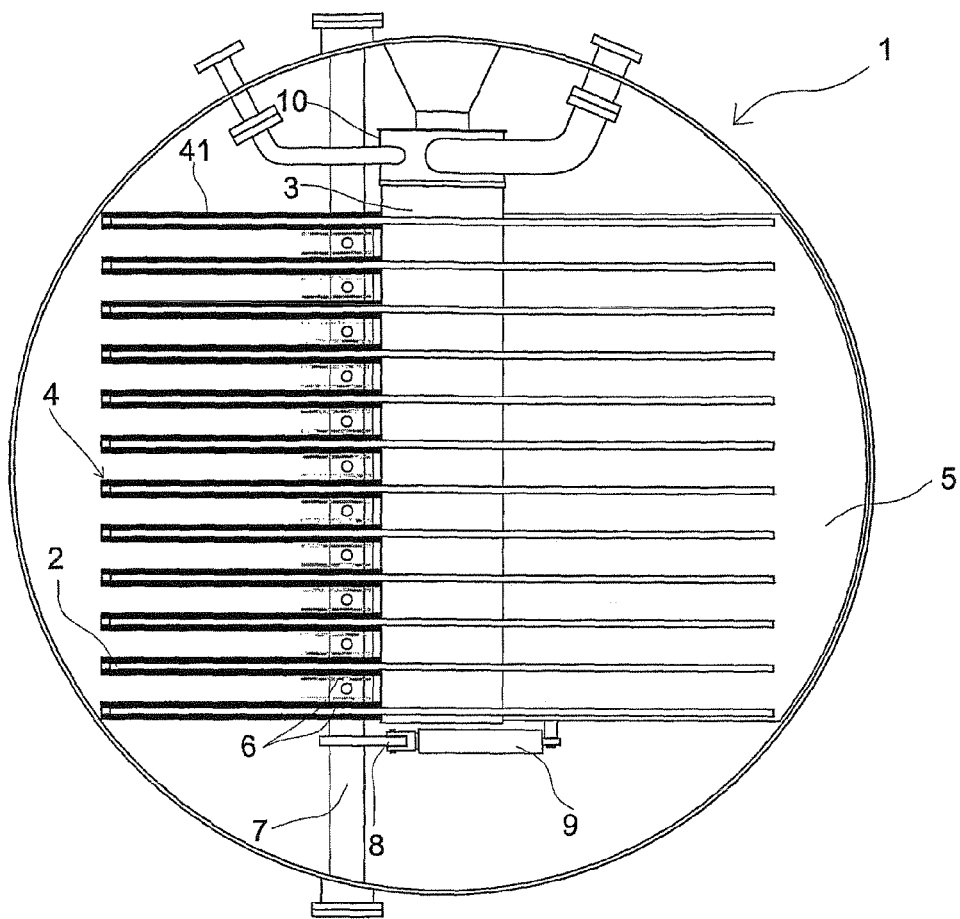
FIG. 2 depicts a view from above of the device of FIG. 1.

The troughs 4, which are situated on the cake discharge side, communicate with a single tank 5 situated on the other side, as depicted in FIG. 2, and which receives the laden liquid, also known as the suspension or the "slurry".

Because of the pressure differential there is between the inside of the vessel 1, and therefore the troughs 4 and the tank 5, on the one hand, and the internal volume of the sectors 20 of the rotating disks 2, on the other, the liquid present in the suspension, also known as the filtrate, is driven through the cloth of the immersed sectors while the separated solid matter forms a cake which remains pressed against the flanks of the disks as the sectors 2 leave the tank 5.

Using the distributor 10 to establish a backpressure inside the sectors which, as they rotate, are situated above the deflectors 41 and before these sectors are reimmersed in the suspension, allows the cakes to be detached which cakes are then directed by the deflectors 41 into the space between the troughs 4.

It is at that point that it is necessary to ensure that the cakes, as they fall, do not adhere to the walls of the troughs 4 and cannot create bridges that cause clogging.

To achieve that, the device of the invention comprises means for scraping the deposits off the walls of the troughs 4 as soon as the deposits form.

These scraping means comprise vertical pivoting doctor blades 6 diverted upward along the walls of the troughs 4 and mounted on a horizontal support spindle 7.

The spindle 7 is positioned under the troughs 4 outside of the space reserved for the falling cakes, and is provided with a link rod 8 articulated to a control actuator 9.

The actuator 9 is preferably a pneumatic actuator which may be powered by the higher-pressure air present in the housing.

The doctor blades 6 sweep across the space between two troughs 4 and are linked together at their lower end and fixed to a cylindrical mount 60 equipped with a set of two pins 61.

The mount 60 is slidably engaged in a tubular sleeve 70 that passes through the spindle 7 to which it is welded, as depicted in FIG. 3.

In this configuration, the doctor blades 6 are held in place by their own weight and are set in position by the pins 61 which nest into notches formed in the tube 70.

The doctor blades 6 are secured in pairs so that they act on the facing walls of two adjacent troughs 4, as are depicted in FIG. 3.

For preference, each pair of doctor blades 6 is produced as a single piece by bending into a U shape a continuous doctor blade which has beveled edges on each side.

The doctor blades 6 thus, in the manner of a knife, skim off any potential deposit that might be adhering to the walls of the troughs and prevent the formation of bridges which are all the more likely to occur when the space between the walls is small.

The invention claimed is:

1. A pressurized filtration device comprising: an airtight vessel housing disks made up of filter sectors carried by a rotary shaft and coupled to collectors housed inside said shaft, a distributor for letting out the filtrate, venting the deliquoring air and admitting the blowing air intended for detaching a deliquored cake, at least one inlet pipe for liquid laden with solid particles, at least one outlet pipe for the filtrate and a hopper for collecting the solid particles, wherein the disks are arranged vertically so that their lower part is immersed in troughs covered by deflectors and comprising means of scraping deposits of solid matter off exterior walls of the troughs, and wherein said scraper means comprise pivoting doctor blades mounted on a horizontal support spindle.

2. The filtration device as claimed in claim 1, wherein said doctor blades are positioned under the troughs and provided with a link rod the end of which is connected to a control actuator.

3. The filtration device as claimed in claim 2, wherein said doctor blades are borne by a cylindrical mount equipped with a set of two setting pins and intended to be fixed into tubular sleeves that pass through the spindle.

4. The filtration device as claimed in claim 2, wherein said doctor blades are secured in pairs so that they act on the facing walls of two adjacent troughs.

5. The filtration device as claimed in claim 3, wherein said pins are engaged in notches formed in the outer end of the tubular sleeves.

6. The filtration device as claimed in claim 2, wherein said support spindle is positioned under the troughs in a region not in the path of the cakes.

7. The filtration device as claimed in claim 2, wherein said actuator is a pneumatic actuator and via a link rod causes the doctor blades to move back and forth along the exterior walls of the troughs.

* * * * *